US007213245B2

(12) United States Patent
Chan et al.

(10) Patent No.: US 7,213,245 B2
(45) Date of Patent: May 1, 2007

(54) SOFTWARE ON DEMAND SYSTEM (75) Inventors: Hon Keat W. Chan, Bellevue, WA (US); Andrew J. Edwards, Bellevue, WA (US); David Gillies, Bellevue, WA (US); Carlos P. Gomes, Redmond, WA (US); Jiyang Liu, Sammamish, WA (US); Patrick L. McDonald, Seattle, WA (US); Mark L. Roberts, Bellevue, WA (US); Hoi Vo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 695 days.

(21) Appl. No.: 10/146,611

(22) Filed: May 14, 2002

(65) Prior Publication Data

US 2003/0217196 A1    Nov. 20, 2003

(51) Int. Cl.
    *G06F 9/44* (2006.01)
(52) U.S. Cl. ..................................... 717/167
(58) Field of Classification Search ................. 717/118, 717/136, 147–178; 719/315, 331; 709/200, 709/203, 213–218, 224, 225; 715/513, 744; 707/102
See application file for complete search history.

(56) References Cited

U.S. PATENT DOCUMENTS

| 5,754,755 | A  | * | 5/1998  | Smith, Jr. ..................... 714/38  |
| 5,940,594 | A  | * | 8/1999  | Ali et al. ..................... 709/203 |
| 5,999,732 | A  | * | 12/1999 | Bak et al. .................... 717/148  |
| 6,003,082 | A  | * | 12/1999 | Gampper et al. ............ 709/225      |
| 6,243,172 | B1 | * | 6/2001  | Gauthier et al. ............ 358/1.18    |
| 6,324,685 | B1 | * | 11/2001 | Balassanian ................. 717/118    |
| 6,446,088 | B1 | * | 9/2002  | Vaduvur et al. ............. 707/201     |
| 6,684,370 | B1 | * | 1/2004  | Sikorsky et al. ............ 715/513     |
| 2002/0083154 | A1 | * | 6/2002 | Auffray et al. ............. 709/218     |
| 2002/0099818 | A1 | * | 7/2002 | Russell et al. .............. 709/224     |
| 2003/0014442 | A1 | * | 1/2003 | Shiigi et al. ................. 707/513   |

OTHER PUBLICATIONS

Shiigi et al., U.S. Appl. No. 60/305555, "Programming method for Web-based content Management", specifications, pp. 1-17, & Appendix pp. 1-4.*

* cited by examiner

Primary Examiner—Tuan Vu
(74) Attorney, Agent, or Firm—Merchant & Gould P.C.

(57) ABSTRACT

A method of supplying program units of a computer program as the program needs the program units includes running a program skeleton. The program skeleton is derived from the program, but has a program stub where a program unit associated with the program stub may be inserted. Upon encountering the program stub, the method includes getting the program unit associated with the program stub and inserting the program unit at the program stub. A method of supplying funclets of a computer program from a server computer system to a client computer system includes receiving a plurality of requests for funclets during a test period. If a tested probability of requests for a first funclet being followed by requests for a second funclet is at least a predetermined probability, then the method also includes sending the first funclet and the second funclet to the client computer system in response to a request from the client computer system for the first funclet after the test period.

23 Claims, 10 Drawing Sheets

SOFTWARE ON DEMAND SYSTEM

TECHNICAL FIELD

This application relates generally to software application systems and more particularly to a software application system for loading software on demand.

BACKGROUND OF THE INVENTION

Computer systems often involve downloading applications and data from a server system for use on a client system. The applications or data may be downloaded only once and then stored on the client computer or they may be downloaded each time the application or data is used. In present application download systems, the client computer initiates a launch mechanism for a desired application, and the compressed bits for the entire application are streamed down from the server and onto the client system. The bits are then decompressed, installed, and executed. Such systems allow no overlap between download time and the execution. The client computer waits until the entire application has been downloaded before beginning execution of the program. Also, a client computer utilizes only about twenty percent of an application's total size during a typical user scenario. Thus, about eighty percent of the downloaded application code is unnecessary. While applications are typically cached after they are initially downloaded, the first time download wastes significant bandwidth resources. Also, the time for starting up many applications is extremely long for clients without high-speed connections to servers.

Some systems have used a process called paging, in which an application is split into pages of equal size and each page is downloaded as it is needed by the application. However, such systems often require download of code that is unnecessary because it happens to be on the same page as the requested code. This again wastes bandwidth resources and time. It may also have adverse effects on the operation of the application because the downloaded pages are not arranged in a logical manner.

SUMMARY OF THE INVENTION

In accordance with the present invention, the above and other problems are solved by supplying portions of program code or program data of a computer program as the portions are needed by the program. Rather than downloading and running an entire program on a computing system, the computing system runs a smaller program skeleton. The computing system generally downloads the portions of computer program and inserts them into the skeleton, as they are needed.

In accordance with other aspects, the present invention relates to a method of supplying program units of a computer program, as the program needs the program units. The program units are portions of program code or data of the program. The method includes running a program skeleton. The program skeleton is derived from the program, but has a program stub where a program unit associated with the program stub may be inserted. Upon encountering the program stub while running the program skeleton, the method includes getting the program unit associated with the program stub and inserting the program unit at the program stub in the program skeleton.

In accordance with still other aspects, the present invention relates to a method of supplying funclets of a computer program from a server computer system to a client computer system as the funclets are needed by the program. The method includes receiving a plurality of requests for funclets during a test period and determining whether a tested probability of requests for a first funclet being followed by requests for a second funclet is at least a predetermined probability. If the tested probability is at least the predetermined probability, then the method also includes sending the first funclet and the second funclet to the client computer system in response to a request from the client computer system for the first funclet after the test period.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

An embodiment of the present invention separates portions of operational code and/or data of a computer program to be downloaded into program units referred to herein as "funclets." Funclets are preferably defined in accordance with the logic of a particular program so as to avoid downloading unneeded code or data and to optimize the performance of the program on the client system. Rather than downloading an entire program from a server system to a client system, a program skeleton is downloaded and the funclets from the program are downloaded as they are needed by the program, as described below.

Figure 1:
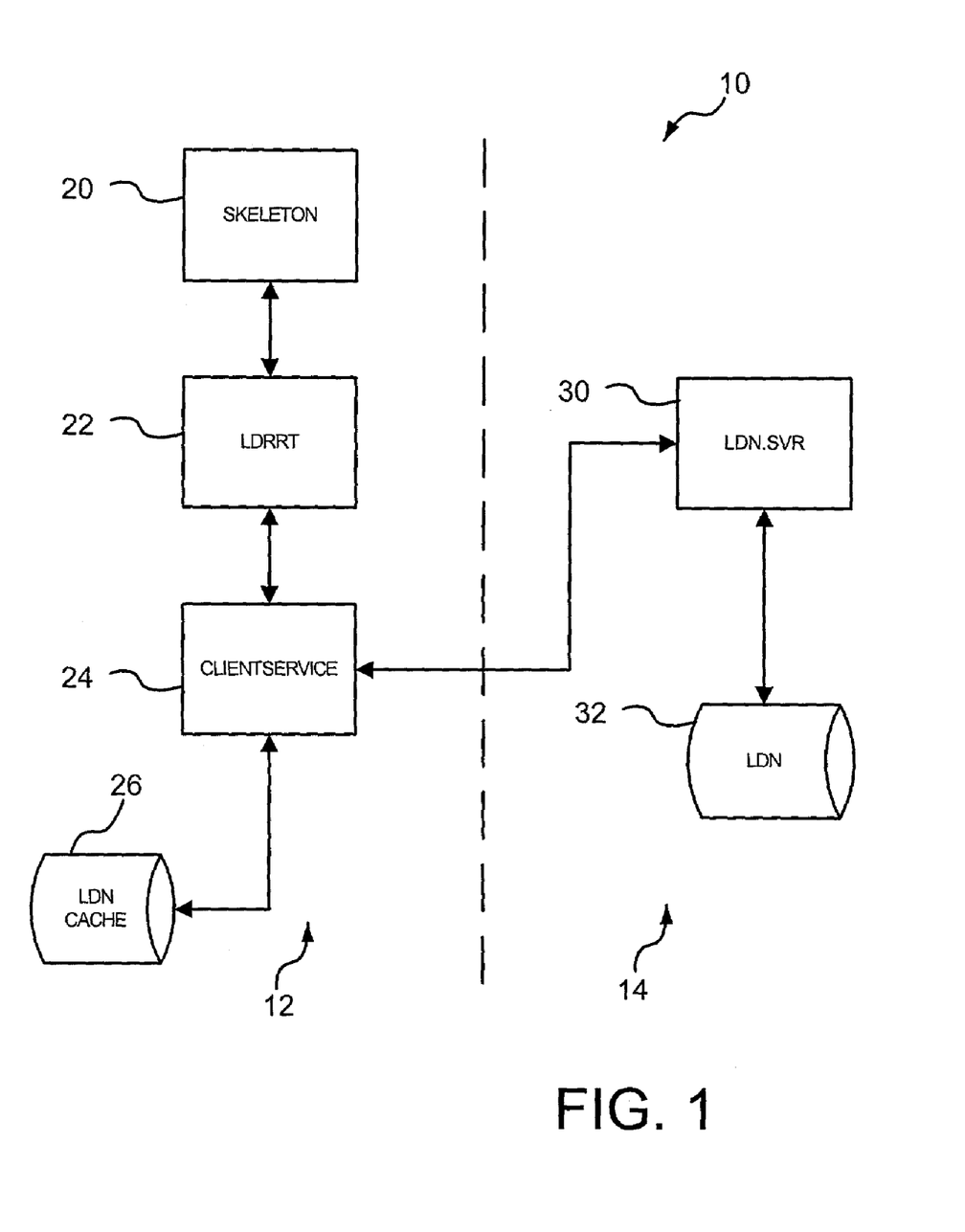
FIG. 1 illustrates a system for supplying software on demand according to a preferred embodiment of the present invention.

Referring now to FIG. 1, a software on demand system 10 includes a client system 12 and a server system 14. The client system 12 receives or already has a program skeleton 20, which includes the general binary code structure of a corresponding program. However, the majority of the code or data from the program is missing from the skeleton 20. More specifically, the program skeleton 20 is missing the funclets. In place of each funclet is a program stub or binary stub, which includes a call to a LDRRT (loader run time) module 22 requesting the missing funclet. The program skeleton 20 will be significantly smaller than the original program. For example, in the use of a particular word processing application, the original program is 8.8 MB, while the resulting skeleton is only 225 KB. The LDRRT module is preferably a .DLL program. The client system 12 can have multiple program skeletons with each having a corresponding LDRRT module. Alternatively, a single LDRRT can correspond to multiple programs. The LDRRT module 22 is able to communicate with a CLIENTSERVICE module 24 in addition to communicating with the application skeleton 20. The CLIENTSERVICE module 24 is preferably an executable program, although it may be some other type of program, such as a .DLL program.

The CLIENTSERVICE module 24 is able to communicate with an LDN (Loader.net) cache 26. The LDN cache 26 is preferably a portion of the memory on the client system 12. The LDN cache 26 contains funclets that have been downloaded previously onto the client system 12. The CLIENTSERVICE module 24 is able to retrieve funclets from, save funclets to, or delete funclets from the LDN cache 26.

The CLIENTSERVICE module 24 is also able to communicate with an LDN.SVR (Loader.net server) module 30 on the server system 14. The LDN.SVR module 30 receives requests for funclets from the CLIENTSERVICE module 24 and retrieves the desired funclets from an LDN storage 32. The LDN 32 is preferably a portion of a storage medium, such as a hard disc, on the server system 14. The LDN 32 preferably includes all the funclets from the original program.

Figure 2:
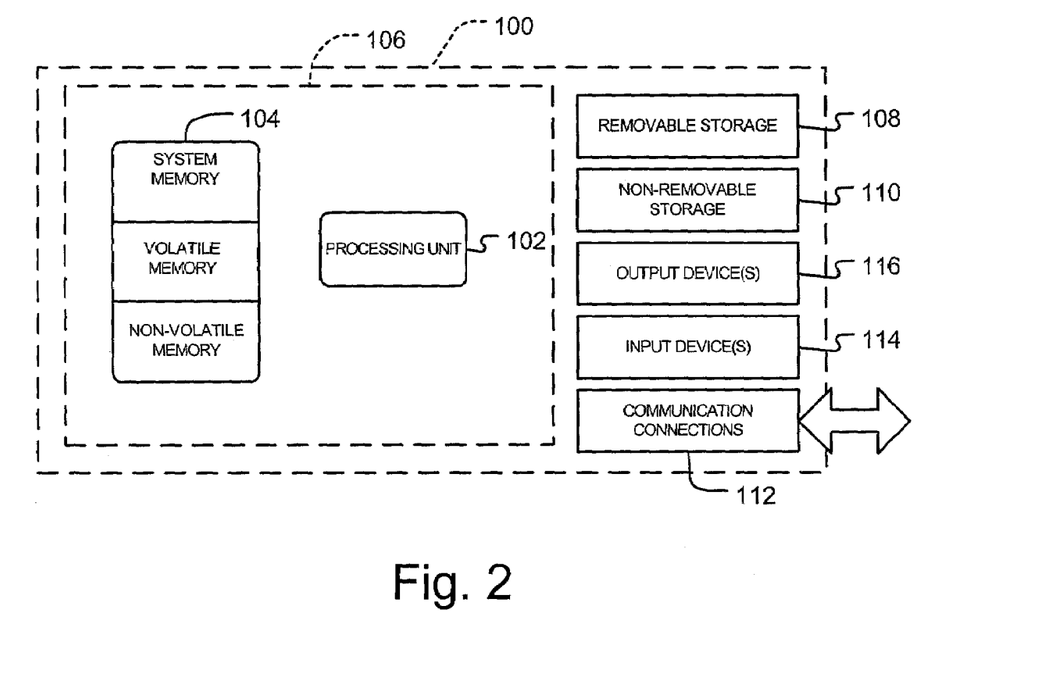
FIG. 2 illustrates a computing system, such as a system that can be used for the client and server systems of FIG. 1.

The computer systems 12 and 14 may be represented by the computer system 100 shown in FIG. 2. In its most basic configuration, computing system 100 is illustrated in FIG. 2 by dashed line 106 encompassing the processor 102 and the memory 104. Additionally, system 100 may also include additional storage (removable and/or non-removable) including, but not limited to, magnetic or optical disks or tape. Such additional storage is illustrated in FIG. 2 by removable storage 108 and non-removable storage 110. Computer storage media, such as memory 104, removable storage 108 or non-removable storage 110 includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 100. Any such computer storage media may be part of system 100. Depending on the configuration and type of computing device, memory 104 may be volatile, non-volatile or some combination of the two.

System 100 may also contain communications connection(s) 112 that allow the device to communicate with other devices. Additionally, system 100 may have input device(s) 114 such as keyboard, mouse, pen, voice input device, touch input device, etc. Output device(s) 116 such as a display, speakers, printer, etc. may also be included. All these devices are well known in the art and need not be discussed at length here.

Computer system 100 typically includes at least some form of computer readable media. Computer readable media can be any available media that can be accessed by system 100. By way of example, and not limitation, computer readable media may comprise computer storage media and communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 3:
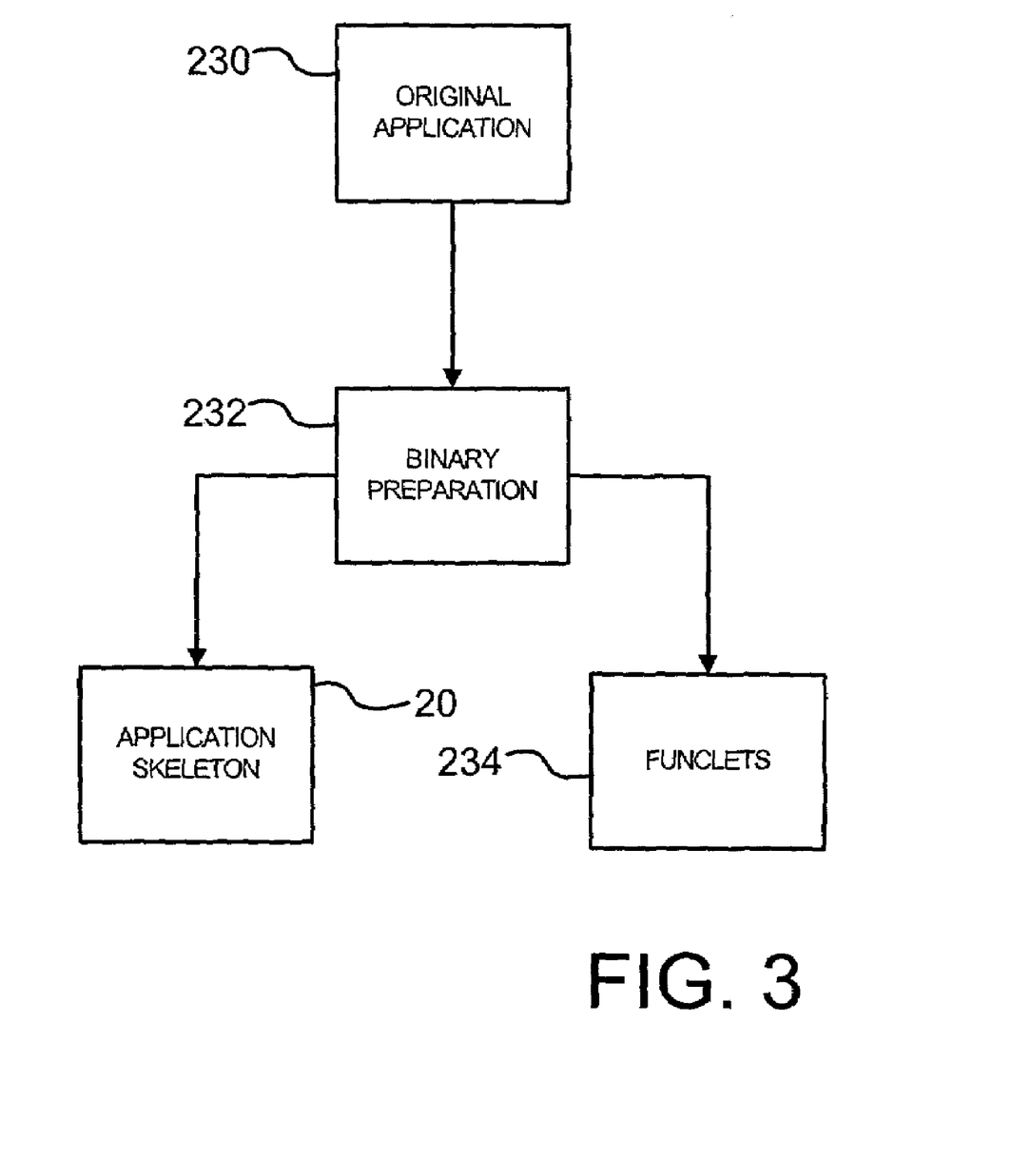
FIG. 3 illustrates an operational flow for preparing an application for use with an embodiment of the present invention.

Referring now to FIG. 3, before an application program is used with the software on demand system 10, the original application 230 is processed in a binary preparation operation 232, which preferably includes processing both binary code and data of the original application 230. The binary preparation operation 232 is described in more detail in U.S. patent application Ser. No. 10/146,635 entitled "Preparation for Software on Demand System," which is filed on even date with the present application and is incorporated herein by reference. The binary preparation operation 232 receives the original application 230 and yields the application skeleton 20 and the funclets 234 to be stored in the LDN 32, all corresponding to the original application 230.

Figure 4:
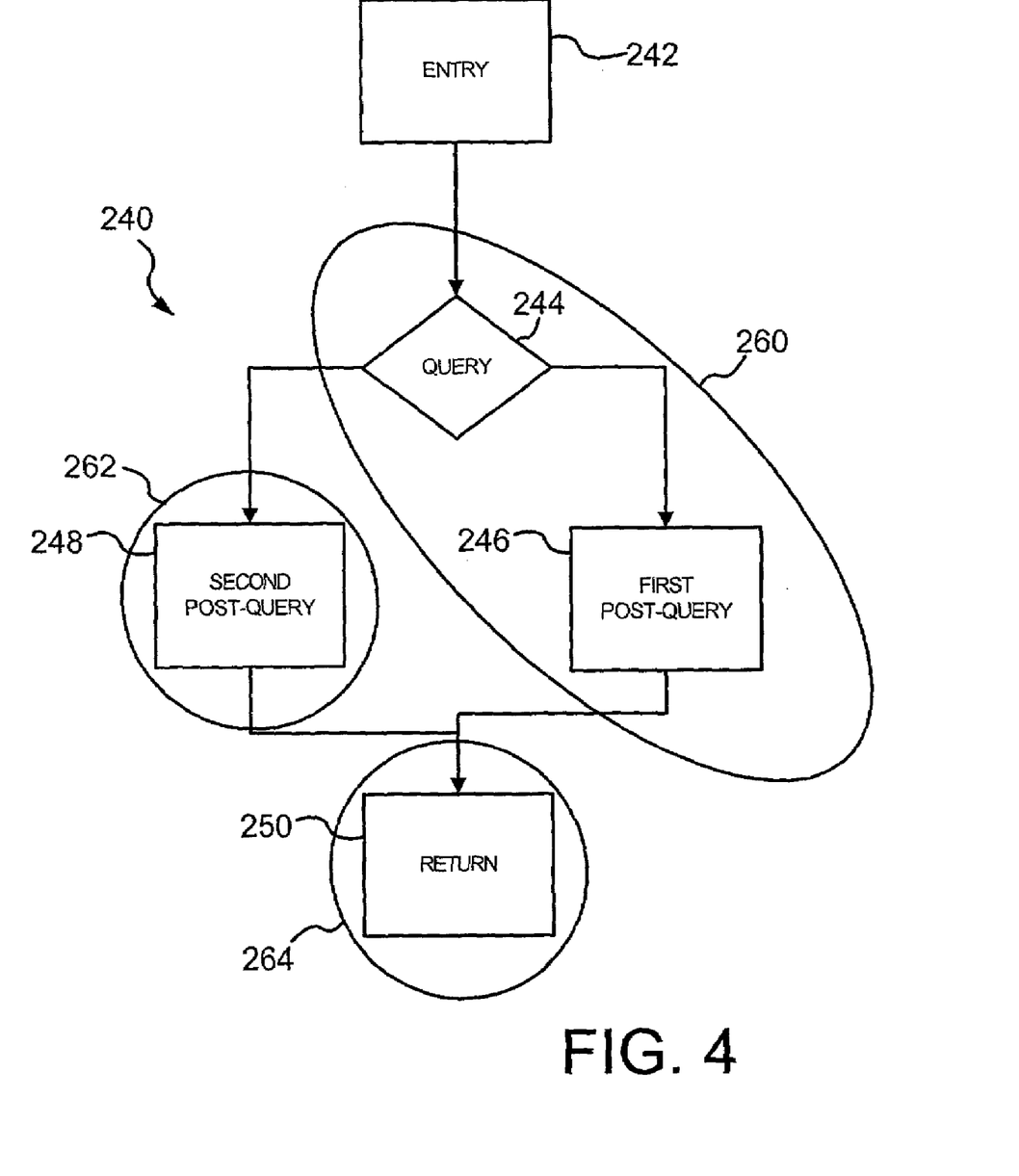
FIG. 4 illustrates a portion of an application, showing how that portion could be divided into funclets according to an embodiment of the present invention.

The funclets 234 are preferably defined in accordance with the logic of the original application 230. Each funclet 234 preferably has only a single entry point so that each funclet will have only a single corresponding binary stub. However, each funclet 234 may have multiple exit points. FIG. 4 illustrates a portion 240 of the process flow of the original application 230. An entry operation 242 calls a query operation 244, such as an "IF" operation. The query operation 244 may call either a first post-query operation 246 or a second post-query operation 248. Upon completion, the active post-query operation 246, 248 calls a common return operation 250. As is shown, the query operation 244 and the first post-query operation 246 may be combined into a first funclet 260 because it is highly likely that entry into the query operation 244 will result in a call to the first post-query operation 246 based on the logic of the application 230. The second post-query operation 248 defines a second funclet 262, and the return operation 250 defines a third funclet 264. By thus defining the funclets according to the process flow of the original application 230, the downloading of unnecessary data or code is minimized. Note that the second post-query operation 248 and the return operation 250 would preferably not be included in a single funclet because the resulting funclet would have two entry points (one from the query operation 244 into the second post-query operation 248 and another from the first post-query operation 248 into the return operation 250).

Figure 5:
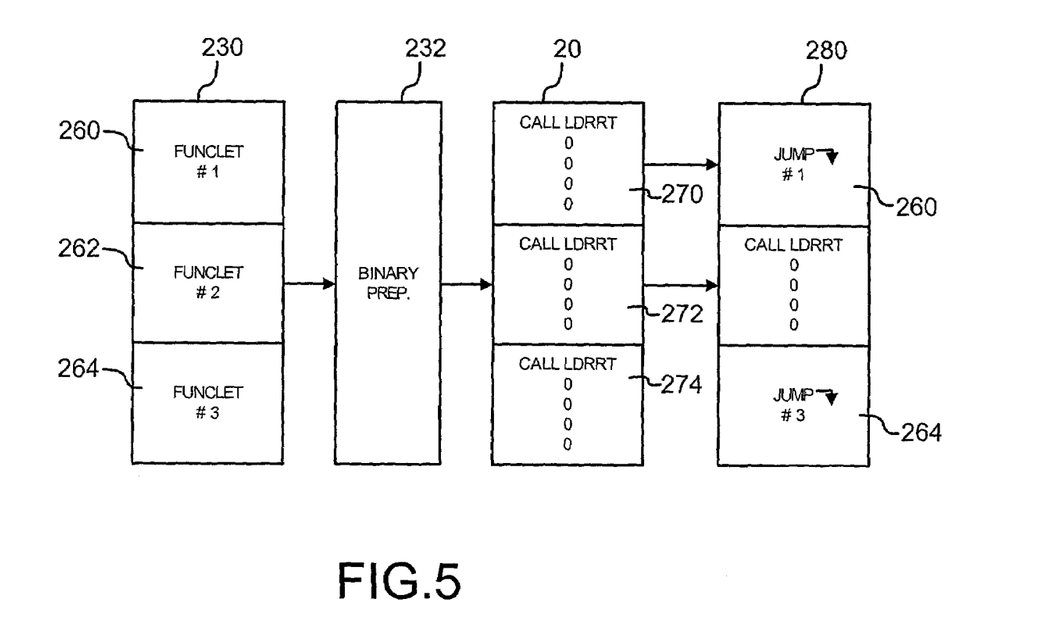
FIG. 5 illustrates an operational flow of three funclet divisions of an original program and the corresponding features of the resulting program skeleton and the resulting run time version of the program.

Referring now to FIG. 5, the original application 230 includes the first funclet 260, the second funclet 262, and the third funclet 264. The binary preparation operation 232 replaces the first funclet 260, the second funclet 262, and the third funclet 264 from the original application 230 with a first binary stub 270, a second binary stub 272, and a third binary stub 274, respectively. In a preferred embodiment, each binary stub 270, 272, 274 includes a call to the LDRRT module 22 and unused space filled with zeros to replace the missing funclet 260, 262, 264, respectively. While running the application, the application skeleton 20 is loaded into run time memory, such as the RAM of the client system 12. The application skeleton 20 thus forms the basis for a run time application 280.

When a binary stub 270, 272, 274 is encountered in the run time application 280, and the corresponding funclet 260, 262, 264 and preferably any dependent funclets (e.g., funclets which include only data and are referenced by code or data within the corresponding funclet 260, 262, 264) are retrieved and decompressed, the corresponding funclet 260, 262, 264 and any dependent funclets are "patched" into the run time application 280. In other words, the binary stub 270, 272, 274 is replaced with a "jump" command and the corresponding funclet 260, 262, 264 and any dependent funclets. Thus, the retrieved funclet 260, 262, 264 is inserted in the same place in the run time application 280 as it was in the original application 230. Accordingly, the performance of the run time application 280 is not hindered by the inserted funclets.

As shown in FIG. 5, only the first binary stub 270 and the third binary stub 274 have been encountered during the present run of the run time application 280. Thus, the first binary stub 270 and the third binary stub 274 have been replaced with the first funclet 260 and the third funclet 264, respectively. The second binary stub 272 remains in the run time program because the second funclet 262 has not yet been retrieved to replace the second binary stub 272.

Figure 6:
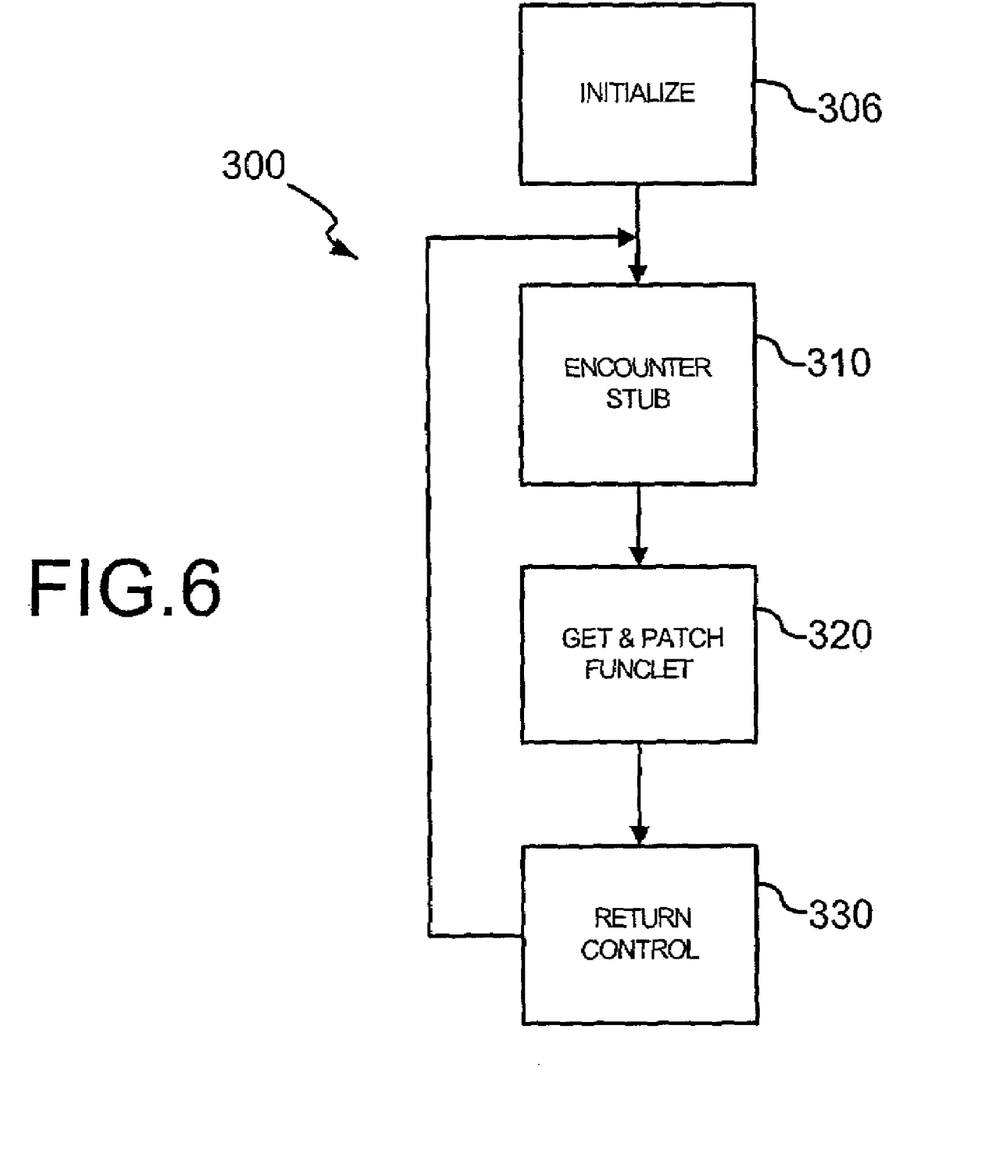
FIG. 6 illustrates an operational flow of an embodiment of the loading process.

Referring now to FIG. 6, the operational flow of the software on demand system 10 of FIGS. 1–5 will be described generally. In initialize operation 306, the particular client system 12 is initialized as described below with reference to FIG. 7. In encounter stub operation 310 a binary stub 270, 272, 274 is encountered while running the run time application 280. In get and patch operation 320, the system 10 gets the funclet 260, 262, 264 corresponding to the encountered binary stub 270, 272, 274 and patches it into the run time application 280 as described below with reference to FIG. 8. Return control operation 330 then returns control and the run time application 280 operates normally until it encounters another binary stub 270, 272, 274.

When the run time application 280 is closed, the LDRRT module 22 for that application preferably closes and prompts the CLIENTSERVICE module 24 to also close its communications with that LDRRT module 22. If no other LDRRT modules are running, the CLIENTSERVICE module 24 preferably closes at that time. However, many applications do not have closing operations that allow the LDRRT module 22 to inform the CLIENTSERVICE module 24 when the run time application 280 is closing. In fact, the run time application 280 and the corresponding LDRRT module 22 may simply disappear from run time memory when the application closes. The CLIENTSERVICE module 24 preferably detects the absence of the run time application 280 and the corresponding LDRRT module 22. The CLIENTSERVICE module 24 then either closes down communications with that LDRRT module 22 or closes the CLIENTSERVICE module 24 altogether, as is appropriate.

Figure 7:
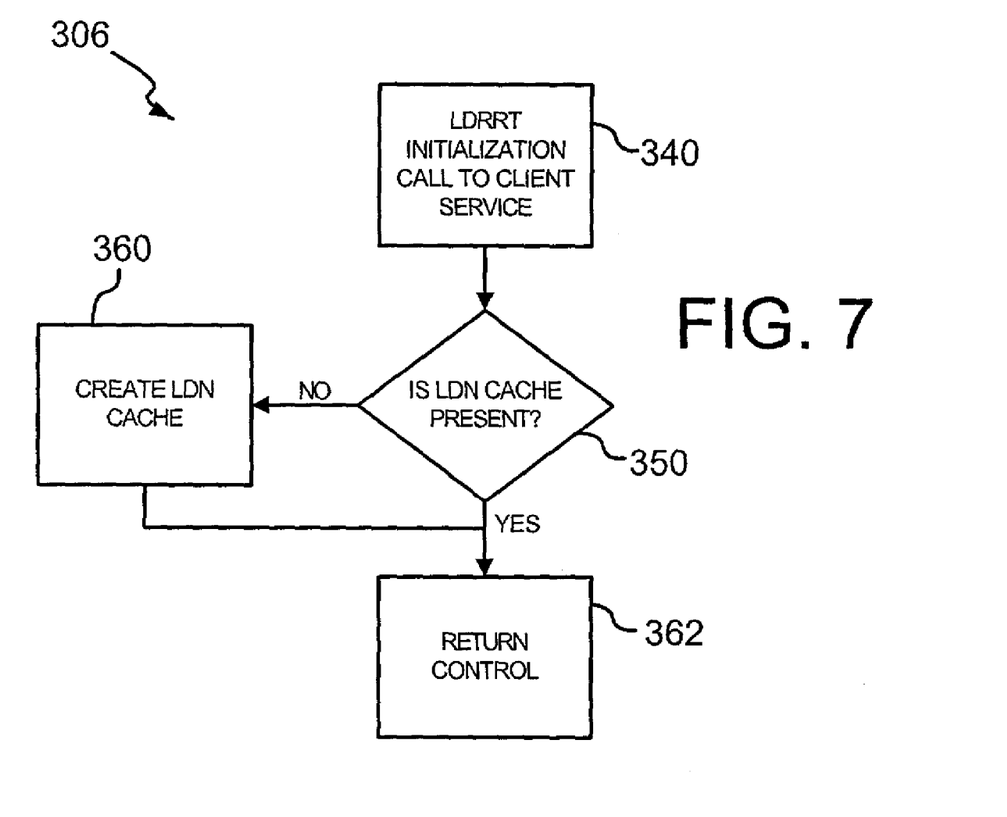
FIG. 7 illustrates an operational flow of the initialization operation from FIG. 5.

Referring now to FIG. 7, the initialize operation 306 will be described in more detail. When the application is started, the LDRRT module 22 for that application sends an initialization call to the CLIENTSERVICE module 24 in call to client service operation 340. In query operation 350, the CLIENTSERVICE module 24 determines whether the LDN cache 26 is present on the client system 12. If the LDN cache 26 is not present, then the CLIENTSERVICE module 24 prompts the client system 12 to create the LDN cache 26 in cache create operation 360. After either the cache has been created in cache create operation 360 or the CLIENTSERVICE module 24 has determined that the cache was already present in query operation 350, return control operation 362 returns control.

The application can begin to run as soon as the initialization operation 306 described above is accomplished and the application skeleton 20 is loaded in run time memory (either after being downloaded or being loaded from memory or storage of the client system 12). In traditional systems, an application would not run until the entire application had been downloaded. The time to download the application skeleton 20 is significantly less than the time to download the entire application. Thus, the time savings from using the system 10 can be significant, especially when using large applications in downloading systems with slow connections.

Figure 8:
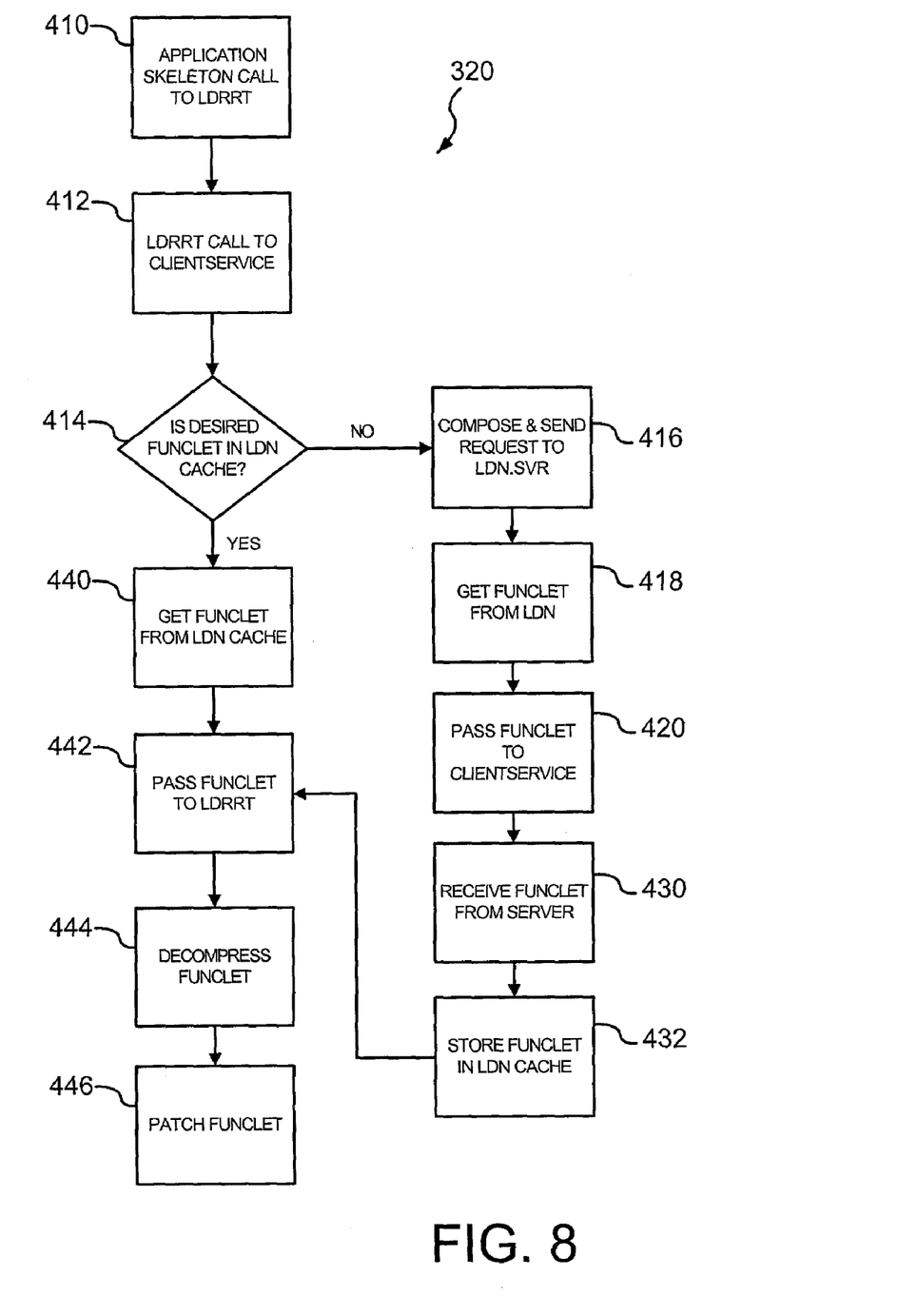
FIG. 8 illustrates an operational flow of the get and patch funclet operation from FIG. 5.

Referring now to FIG. 8, get and patch funclet operation 320 will be described in more detail. Call to LDRRT operation 410 calls the LDRRT module 22 with a request for a specific funclet 260, 262, 264 to replace an encountered binary stub 270, 272, 274. Call to CLIENTSERVICE operation 412 then calls the CLIENTSERVICE module 24 with a request from the LDRRT module 22 for the desired funclet 260, 262, 264. A cache query operation 414 determines whether the desired funclet 260, 262, 264 is in the LDN cache 26.

If the cache query operation 414 determines that the desired funclet 260, 262, 264 is not in the LDN cache 26, then a compose and send request operation 416 composes a request for the desired funclet 260, 262, 264 and sends it to the LDN.SVR module 30 on the server system 14. In a preferred embodiment, the request is in HTML format and includes the identification of the skeleton and the identification of the requested funclet. A get funclet from LDN operation 418 gets the desired funclet 260, 262, 264 from the LDN 32 on the server system 14. A pass funclet to CLIENTSERVICE operation 420 then transmits the funclet from the server system 14 to the client system 12 over a communications link. A receive funclet from server operation 430 receives the funclet within the CLIENTSERVICE module 24 of the client system 12. A store funclet in cache operation 432 then stores the desired funclet 260, 262, 264 in the LDN cache 26 on the client system 12. Preferably, the desired funclet 260, 262, 264 remains compressed when it is stored in the LDN cache 26.

If the cache query operation 414 determines that the desired funclet 260, 262, 264 is in the LDN cache 26, then a get funclet from cache operation 440 gets the funclet from the LDN cache 26 and passes it to the CLIENTSERVICE module 24.

Whether the desired funclet 260, 262, 264 was retrieved from the LDN cache 26 or from the LDN 32, a pass funclet to LDRRT operation 442 passes the funclet to the LDRRT module 22 that requested the funclet 260, 262, 264. A decompress funclet operation 444 then decompresses the funclet, and a patch funclet operation 446 patches the funclet into the run time application, as described above with reference to FIG. 3.

Figure 9:
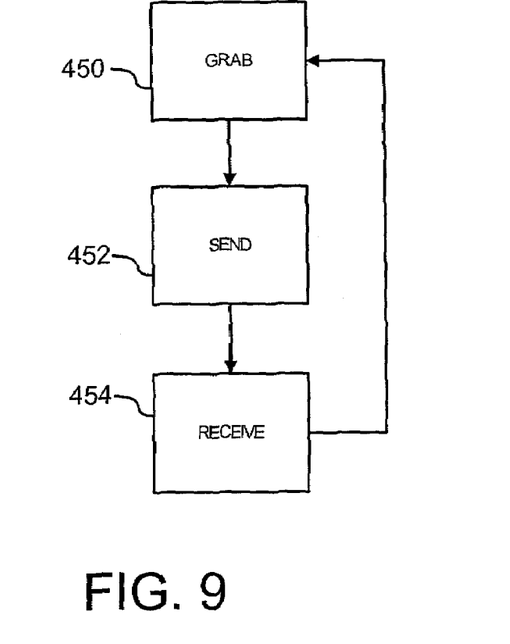
FIG. 9 illustrates an operational flow of the working thread of a CLIENTSERVICE module according to an embodiment of the present invention.

FIG. 9 illustrates the operation of a CLIENTSERVICE module 24 worker thread. The CLIENTSERVICE module 24 worker thread continuously circles between a grab operation 450, a send operation 452, and a receive operation 454. The grab operation 450 pulls a request from a request queue containing requests for funclets that are waiting to be sent to the server system 14; the send operation 452 then sends the request that was previously grabbed to the server system 14; and the receive operation 454 receives a funclet from the server system 14.

The grab operation 450 only grabs a request if one is available from the queue. If one is not available, then the thread continues to the send operation 452 without grabbing a request. If no request was grabbed in grab operation 450, then the thread continues to the receive operation 454 without sending a request. Likewise, if a funclet is not available from the server system 14 during the receive operation 454, then the thread proceeds to the grab operation 450 without receiving a funclet.

As funclets are received from the server system 14, the CLIENTSERVICE module 24 is able to recognize the desired funclet and route it to the requesting LDRRT module 22 even if the funclets are received from the server system 14 in a different order than the requests for those funclets were sent. Also, the CLIENTSERVICE module 24 is preferably able to process requests from multiple LDRRT modules, and each LDRRT module 22 and the CLIENTSERVICE module 24 are preferably able to process requests from multiple threads of a single application.

Figure 10:
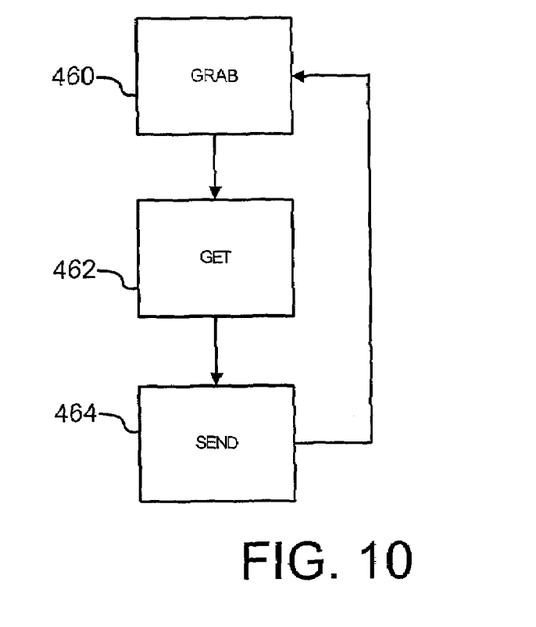
FIG. 10 illustrates an operational flow of the working thread of a LDN.SVR module according to an embodiment of the present invention.

FIG. 10 illustrates the operation of a LDN.SVR module 30 worker thread. The LDN.SVR module 30 worker thread continuously circles between a grab operation 460, which pulls a request from a request queue containing requests for funclets that are waiting to be executed. A get operation 462 then gets a funclet corresponding to the request from the LDN 32. A send operation 464 then sends the funclet to the client system 12, where it is received by the receive operation 454 of the CLIENTSERVICE working thread.

The grab operation 460 only grabs a request if one is available from the queue. If one is not available, then the thread continues to the get operation 462 without grabbing a request. If no request was grabbed in grab operation 460, then the thread continues to the send operation 464 without getting a funclet from the LDN 32. Likewise, if no funclet was retrieved from the LDN 32 in get operation 462, the thread proceeds to the grab operation 460 without sending a funclet.

The LDN.SVR module 30 is preferably able to process requests from multiple client systems and send the desired funclets to the client system 12 from which each request was received.

Figure 11:
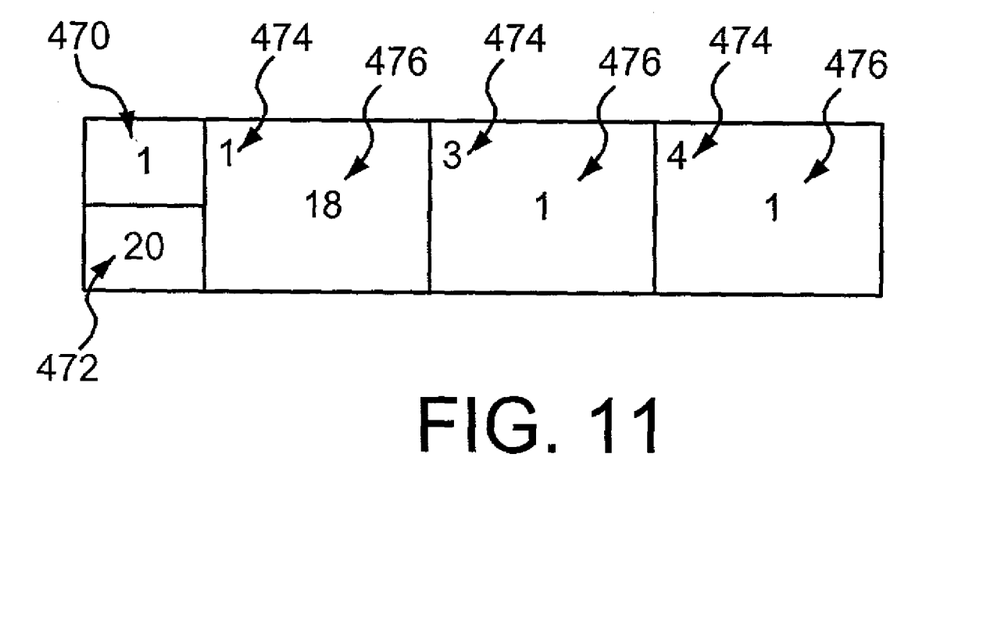
FIG. 11 illustrates the results of an optimization test for determining whether two or more funclets should be joined in a LDN according to an embodiment of the present invention.

The server system 14 preferably performs tests to determine the probability that a particular funclet will be requested immediately following a request for another particular funclet. FIG. 11 illustrates the results of tracking a particular funclet for such a test. As shown, the server system 14 tracks the identity 470 of the subject funclet, shown in FIG. 11 as funclet 1. The server system 14 preferably counts the total number of requests 472 for the subject funclet during the test. The server system then tracks the identity 474 of each follower funclet (i.e., a funclet that is requested immediately after the subject funclet), and the number of times 476 it has immediately followed the subject funclet (i.e., a request for the following funclet was received immediately following a request for the subject funclet). The server system 14 preferably determines whether a following funclet meets a predetermined minimum probability of being requested immediately following the subject funclet. As an example, the test might determine whether the probability of the following funclet immediately following the subject funclet is at least ninety percent. For the results illustrated in FIG. 11, only funclet 2 would meet this test because it followed funclet 1 eighteen out of twenty times that funclet 1 was requested, indicating that the probability of requests for funclet 1 being followed by requests for funclet 2 is ninety percent.

Figure 12:
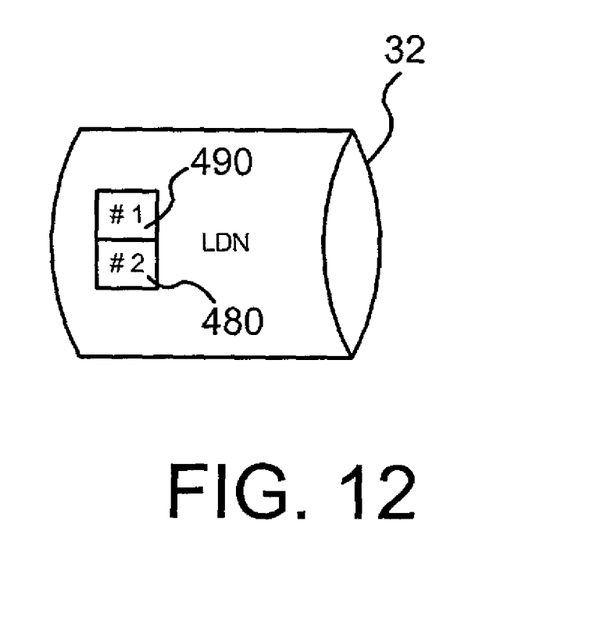
FIG. 12 illustrates two funclets joined together in a LDN, such that a server will send both funclets in response to a request for the first funclet.

As illustrated in FIG. 12, once a following funclet 480 meets the probability test for the subject funclet 490, the following funclet 480 is preferably included within the subject funclet 490 in the LDN 32. Accordingly, every time the server system 14 receives a request for the subject funclet 490, the server system 14 sends the following funclet 480 along with the subject funclet 490. This increases the efficiency of the system 10 by predicting and filling requests before they are sent and thereby decreasing the number of requests that need to be sent and processed. Preferably, the testing described above is performed by the server system 14 during slow times when the server system 14 is receiving and processing few, if any, requests.

The probability of the following funclet 480 may later decrease so that it is no longer advantageous to send the following funclet 480 with the subject funclet 490 every time the subject funclet 490 is requested. Thus, preferably the server system 14 periodically removes the following funclet 480 from within the subject funclet 490 in the LDN 32. Subsequently, the server system 14 again performs the test described above with reference to FIG. 11. The server system 14 places the following funclet 480 back within the subject funclet 490 in the LDN 32 only if the following funclet 480 meets the probability test.

Although the invention has been described in language specific to computer structural features, methodological acts and by computer readable media, it is to be understood that the invention defined in the appended claims is not necessarily limited to the specific structures, acts or media described. As an example, it may be desirable to use the system 10 without the client system 14 having any cache at all, such as in a situation where storage resources on the client system 14 are limited. Also, it may be desirable for the server system 14 to monitor the number of times that the client computer runs a particular application. In this case, a header in a necessary funclet can prevent the client system 12 from caching that particular funclet. Thus, each time the client system runs the particular application, the client system 12 must request the necessary funclet from the server system 14. The server system 14 can thereby monitor the number of requests for the necessary funclet. Therefore, the specific structural features, acts and mediums are disclosed as exemplary embodiments implementing the claimed invention.

While the invention has been particularly shown and described with reference to preferred embodiments thereof, it will be understood by those skilled in the art that various other changes in the form and details may be made therein without departing form the spirit and scope of the invention.

What is claimed is:

1. In a client computing system a method of supplying portions of program code or program data of a computer program, the portions identified as program units, the method supplying the program units as the program units are needed by the program, and comprising:

running a program skeleton derived from the program, the program skeleton having a program stub where a program unit comprising executable code associated with the program stub may be inserted, wherein the program skeleton is previously derived from the computer program by having program stubs replace corresponding program units;

encountering the program stub when running the program skeleton, wherein the program stub contains a call to a loader run time module;

in response to the encountering, the loader run time module requesting the program unit;

receiving the program unit and a second program unit, wherein the second program unit received is based on a previously determined probability of a request for the program unit being followed by a request for the second program unit; and inserting the program unit into the program skeleton and based on the predetermined probability inserting the second program unit into the program skeleton to provide additional functionality.

2. The method of claim 1, wherein the program skeleton is derived from the computer program by using a binary preparation operation that receives the program, defines the program unit, removes the program unit, and inserts the program stub containing the call to the loader runtime module.

3. The method of claim 1, wherein the program stub comprises a binary stub and wherein inserting the program unit comprises replacing at least a portion of the binary stub with the program unit.

4. The method of claim 3, wherein the binary stub comprises sufficient unused space to be replaced by the program unit.

5. The method of claim 3, wherein replacing the binary stub comprises replacing the call and the unused space with a jump command and the program unit.

6. In a client computer system a method of supplying funclets of a computer application as the funclets are needed by the application, and comprising:

running an application skeleton derived from the application, the application skeleton having an application stub where a funclet comprising executable code associated with the application stub may be inserted, wherein the application skeleton is previously derived from the computer application by having application stubs replace corresponding funclets;

encountering the application stub when running the application skeleton, wherein the program stub contains a call to a loader run time module;

determining whether the funclet is in a cache on the client computer system;

getting the funclet from the cache if the funclet is in the cache;

requesting, by the loader run time module, the funclet from a source other than the cache if the funclet is not in the cache;

in response to the requesting, receiving the funclet and a second funclet, wherein the second funclet received is based on a previously determined probability of a request for the funclet being followed by a request for the second funclet; and inserting the funclet in the application skeleton and based on the predetermined probability inserting the second funclet in the application skeleton to provide additional functionality.

7. The method of claim 6, wherein getting the funclet from a source other than the cache comprises:

requesting the funclet from a server computer system; and receiving the funclet from the server computer system.

8. The method of claim 7, further comprising the step of storing the funclet in the cache after receiving the funclet from the server computer system.

9. The method of claim 6, wherein the application stub comprises a binary stub including sufficient unused space to be replaced by the funclet.

10. The method of claim 9, wherein inserting the funclet comprises replacing the call and the unused space with a jump command and the funclet.

11. The method of claim 6, wherein the funclet comprises application code having only one operational entry point.

12. In a server computer system a method of supplying funclets comprising executable code of a computer program skeleton to a client computer system, wherein the client computer system runs the computer program skeleton and encounters a program stub when running the computer program skeleton, the program stub containing a call to a loader run time module that requests funclets, wherein the computer program skeleton is derived from a computer program by having program stubs replace corresponding funclets, the method supplying the funclets as the funclets are needed by the program skeleton, and comprising:

receiving a plurality of requests for funclets during a test period comprising a predetermined period of time;

determining based on the plurality of requests received during the test period whether a tested probability of requests for a first funclet being followed by requests for a second funclet is at least a predetermined probability; and after the test period and in response to a request from the client computer system for the first funclet, sending the first funclet and the second funclet to the client computer system if the tested probability is at least the predetermined probability, and sending only the first funclet if the tested probability is not at least the predetermined probability.

13. The method of claim 12, wherein the first funclet and the second funclet each comprise program code.

14. The method of claim 13, wherein the first funclet and the second funclet each comprise only one operational entry point.

15. The method of claim 12, wherein the predetermined probability is ninety percent.

16. The method of claim 12, further comprising the step of including the second funclet within the first funclet in memory of the server computer system after the test period if the tested probability is at least the predetermined probability.

17. The method of claim 12, wherein the tested probability is the probability of requests for the first funclet being immediately followed by requests for the second funclet.

18. The method of claim 12, further comprising:
receiving a plurality of requests for funclets during a second test period;
determining based on the plurality of requests during the second test period whether a second tested probability of requests for the first funclet being followed by requests for the second funclet is at least the predetermined probability; and
sending the first funclet and the second funclet in response to a request for the first funclet after the second test period only if the second tested probability is at least the predetermined probability.

19. The method of claim 18, further comprising:
including the second funclet within the first funclet in memory of the server computer system after the first aforesaid test period if the first aforesaid tested probability is at least the predetermined probability;
removing the second funclet from the first funclet in memory of the server computer system before the second test period; and
including the second funclet within the first funclet in memory of the server computer system after the second test period if the second tested probability is at least the predetermined probability.

20. A computer program product readable by a client computing system and encoding a computer program of instructions for executing a computer process for supplying portions of program code or program data of a computer program, the portions identified as program units, the process supplying the program units as the program units are needed by the program, said computer process comprising:
running a program skeleton derived from the program, the program skeleton having a program stub where a program unit comprising executable code associated with the program stub may be inserted, wherein the program skeleton is previously derived from the computer program by having program stubs replace corresponding program units;
encountering the program stub when running the program skeleton, wherein the program stub contains a call to a loader run time module;
in response to the encountering, the loader run time module requesting the program unit;
receiving the program unit and a second program unit, wherein the second program unit received is based on a previously determined probability of a request for the program unit being followed by a request for the second program unit; and
inserting the program unit into the program skeleton and based on the predetermined probability inserting the second program unit into the program skeleton to provide additional functionality.

21. The computer program product of claim 20, wherein requesting the program unit comprises:
requesting the program unit from a remote computer system; and
wherein receiving the program unit comprises receiving the program unit from the remote computer system.

22. The computer program product of claim 20, wherein the computer process further comprises:
storing the program unit in a cache on the client computing system running the application skeleton; and
in response to encountering the program stub a second time, retrieving the program unit from the cache.

23. The computer program product of claim 20, wherein inserting the program unit comprises replacing at least a portion of the program stub with the program unit.

* * * * *